Dec. 4, 1956 C. L. VADNAIS 2,772,509
ATTACHMENTS FOR FISHING LINES
Original Filed April 27, 1949

Inventor
Charles L. Vadnais

By Robert M. Dunning

United States Patent Office 2,772,509
Patented Dec. 4, 1956

2,772,509

ATTACHMENTS FOR FISHING LINES

Charles L. Vadnais, St. Paul, Minn.

Original application April 27, 1949, Serial No. 90,030. Divided and this application June 29, 1953, Serial No. 364,583

8 Claims. (Cl. 43—44.91)

My invention relates to an improvement in an attachment for a fishing line and deals particularly with a manner of holding the attachment in fixed location upon the line.

In my previous application, Serial No. 745,861, filed May 3, 1947, for "Fishing Device," now Patent 2,570,293, issued October 9, 1951, I disclosed a bobber and sinker having a passage centrally therethrough and having a resilient member located in the passage for clamping the line in fixed position. This structure included a pair of end plugs connected by a portion of smaller dimensions of a resilient character which tended to pull the plugs into engagement with the ends of the sinker or bobber. The present invention includes a generally similar structure in which the intermediate portion of the resilient element is of proper dimensions to fill the passage through which it extends.

It is an object of the present invention to provide a sinker or a bobber designed for attachment with a fishing line and having an axial passage extending therethrough and a slot extending into communication with this passage through which the line may be threaded into the axial passage. The axial passage is equipped with an elongated body of rubber or other resilient material which is of proper size to fill the axial passage when in normally expanded condition. At the same time this body portion is capable of being stretched and elongated until the body thereof is of substantially smaller dimensions than the axial passage to accommodate a line in the axial passage as well as the stretchable body.

An added feature of the present invention lies in the provision of a resilient core for a sinker or float which may be held from rotation by means engageable with the ends of the core. In anchoring the line in place the core is sometimes twisted so that the line encircles the core and is definitely held from longitudinal movement by the core. I provide shoulders or projections on the ends of the body of the sinker or float so as to engage the enlarged ends of the resilient core and to prevent accidental reverse rotation of the core.

This application is a division of my previously filed application Serial Number 90,030, filed April 27, 1949, for Attachments for Fishing Lines, now abandoned.

These and other objects and novel features of my invention will be more clearly and fully set forth in the following specification and claims.

In the drawings forming a part of my specification:

Figure 1:
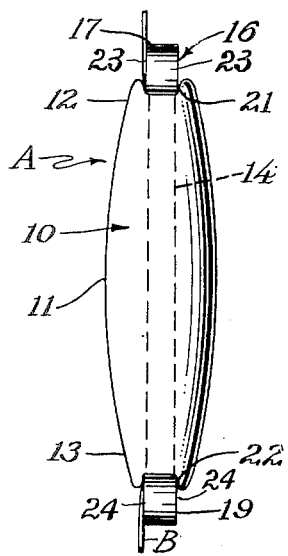
Figure 1 is a side elevational view of a sinker or float body showing the relationship of the parts therein.
Figure 2:
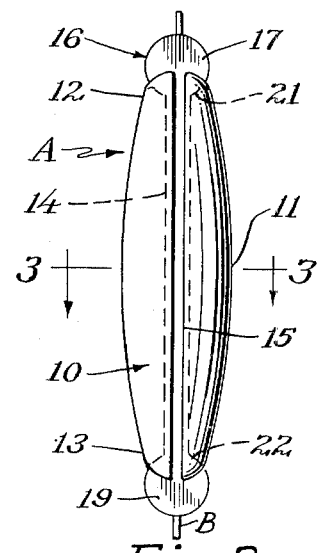
Figure 2 is a front elevational view of the device illustrated in Figure 1.
Figure 3:
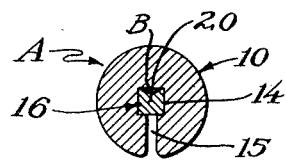
Figure 3 is a sectional view, taken on the line 3—3 of Figure 2, centrally through the sinker or float illustrated in Figures 1 and 2.

The construction illustrated in Figures 1, 2, and 3 of the drawings is preferably designed for use as a sinker although it may be similarly employed as a float or bobber by forming the body of buoyant material rather than heavy material.

The sinker A is shown as having an elongated body 10 which is of greatest diameter at its mid-point 11 and smallest diameters at the upper end 12 and lower end 13. This general shape is often employed for sinkers due to the ease with which the sinkers may be drawn past obstructions without becoming hooked or caught thereupon.

The sinker body 10 is provided with an axial aperture 14 extending longitudinally therethrough. This aperture 14 is shown as being square or rectangular in cross section as indicated in Figure 3 of the drawings. This form is employed in view of the fact that the core is of extruded rubber or similar material and is rectangular in cross section. Obviously the aperture 14 could be of other shape if desired, although the rectangular shape illustrated has advantages. A radially extending slot 15 extends through the body 10 into communication with the aperture 14. The slot 15 is of substantially less width than the aperture 14 as is clearly indicated in Figures 2 and 3 of the drawings.

The core 16 is generally rectangular in cross section as indicated in Figure 3 of the drawings and is provided with enlarged ends 17 and 19 connected by the rectangular shank 20. The rounded ends 17 and 19 are provided with opposed flat surfaces 23 and 24 respectively which may be grasped between the fingers when it is desired to elongate the core. By drawing the enlarged ends 17 and 19 apart, the shank 20 may be reduced in section until it can be moved through the slot 15. Thus the core may be inserted into place by stretching the core to a considerable extent and inserting it through the slot 15 while thus stretched. The central portion 20 of the core is of proper cross sectional dimension to fit snugly within the aperture 14 when the ends 17 and 19 are in engagement with opposite ends of the sinker body.

As indicated in Figures 1 and 2 of the drawings, the sinker is provided with a notch 21 at its upper extremity 12 and a similar notch 22 at its lower extremity 13. The notches 21 and 22 are arranged at right angles to the plane of the slot 15 so that the rounded ends 17 and 19 of the core 16 engage in these notches when the flat surfaces of the ends are at right angles to the plane of the slot 15. The notches 21 and 22 are designed to hold the ends of the core from rotation and the sides of the notches form shoulders which prevent such rotation. Thus the core may be twisted if desired while elongated, and the notches will prevent the core from rotating into normal straight position when they are in engagement with the ends of the core.

The operation of the apparatus is believed understandable from the foregoing description. When the line B is to be inserted, the ends 17 and 19 of the core 16 are grasped, and the core is stretched, reducing its cross-sectional thickness. The line is then threaded through the slot 15 and into the aperture 14. When the core ends are released it increases in thickness, clamping the line against the walls of the aperture. If desired, the core can be twisted before it is permitted to contract, thus gripping the line more effectively.

In accordance with the patent statutes, I have described the principles of construction and operation of my attachment for a fishing line, and while I have endeavored to set forth the best embodiment thereof, I desire to have it understood that this is only illustrative thereof, and that obvious changes may be made within the scope of the following claims without departing from the spirit of my invention.

I claim:

1. An attachment for a fishing line comprising an arrangement including in combination an elongated body having an aperture extending therethrough into which a fishing line is adapted to be inserted, said aperture being of rectangular cross section, said body having a slot of relatively narrow width communicating with said aperture, a contractable and expansible core extending through said aperture with its cross-sectional area normally filling the cross-sectional area of the aperture, and a pair of rounded ends on said core, said rounded ends having opposed flat sides.

2. The construction described in claim 1 and including means on said body engageable with said flat sides for holding the same from rotation relative to said body.

3. An attachment for a fishing line comprising an arrangement including in combination a body having an aperture extending therethrough and a slot communicating with said aperture and through which a line may be inserted into said aperture, said slot being relatively narrow compared to said aperture, and a resilient core extending through said aperture and normally substantially filling the cross-sectional area thereof, said resilient core comprising a body of resilient material having substantially parallel opposed flat sides extending throughout the length thereof, and said resilient body having an elongated center portion substantially rectangular in cross section and enlarged ends thereupon by which the said resilient core can be stretched longitudinally for entry of a fish line in said slot and released to secure and clamp the fish line longitudinally against the sides of said aperture.

4. The structure described in claim 3 and including means on said body for holding said core from rotation with respect thereto.

5. An attachment for fishing lines comprising an arrangement including in combination an elongated body having an aperture extending longitudinally therethrough and a slot communicating with said aperture, a flexible and resilient core extending through, and normally longitudinally compressed against the sides of said aperture to clamp a fish line therein, and projections on the ends of said core extending laterally therefrom, the ends of said body having indentations therein designed to engage said projections and to hold said core from rotation when the said projections on the ends of said core are positioned in said indentations.

6. The structure described in claim 5 and in which the core has sufficient resilient means to tend to draw said projections into said indentations.

7. The structure defined in claim 5 and in which said core is formed of resilient rubber material.

8. The structure described in claim 5 and in which the core and aperture are similarly multisided in shape.

References Cited in the file of this patent

UNITED STATES PATENTS

| | | |
|---|---|---|
| 372,579 | Tafflinger | Nov. 1, 1887 |
| 522,167 | Rawlings | June 26, 1894 |
| 772,798 | Giltner | Oct. 18, 1904 |
| 829,608 | Stanton | Aug. 28, 1906 |
| 919,981 | Unger | Apr. 27, 1909 |
| 2,539,234 | Dobkowski | Jan. 23, 1951 |
| 2,570,293 | Vadnais | Oct. 9, 1951 |